Figure 1:
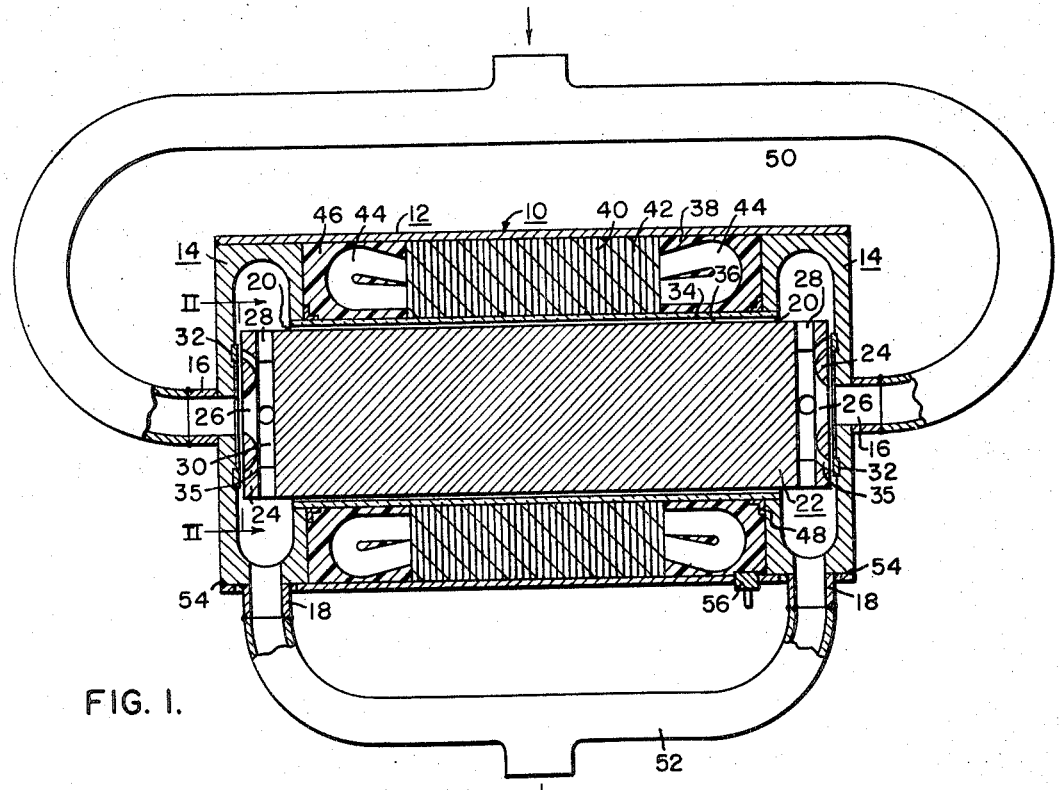

Oct. 17, 1967   D. R. NIXON   3,347,168

MOTOR PUMP UNIT

Filed Feb. 16, 1966

WITNESSES:
*Leon M. Garman*
*James F. Young*

INVENTOR
Donald R. Nixon
BY
ATTORNEY

United States Patent Office 3,347,168
Patented Oct. 17, 1967

3,347,168
MOTOR PUMP UNIT
Donald R. Nixon, Monroeville, Pitcairn, Pa., assignor to Westinghouse Electric Corporation, Pittsburgh, Pa., a corporation of Pennsylvania
Filed Feb. 16, 1966, Ser. No. 527,921
8 Claims. (Cl. 103—87)

The present invention is directed generally to motor-pump units and more particularly to units of simplified construction, compact size and relatively light weight.

Motor pump units have found uses in connection with the circulation of hazardous fluids which must be hermetically contained. Such motor pump units are formed with an enclosure or "can" isolating the rotor chamber from the stator assembly therefor. There are applications of hermetically sealed motor pump units wherein it is desired to maximize the horsepower to weight ratio of the unit while concurrently minimizing the size thereof. The size of a motor pump unit normally is increased by the provision of bearing means for the rotor which absorb both radial and axial thrust, thermal barrier means between the motor and pump sections in instances where a high temperature fluid is being circulated and by the provision of a shaft on which the impeller is mounted. By simplifying the construction of a motor pump unit, i.e., by combining several separate functions in a single part, not only the size of the motor pump unit but the weight thereof can be reduced substantially.

Accordingly, it is an object of this invention to provide a compact, lightweight motor pump unit.

A further object of this invention is to provide a new and improved motor pump unit of compact size which includes means for absorbing both axial and radial thrust created by the rotor and impeller of the unit.

A further object of this invention is to provide a new and improved motor pump unit which is both hermetically sealed and has a relatively high horsepower to weight ratio and a relatively low horsepower to size ratio for circulating high temperature hazardous fluids.

Briefly, the present invention accomplishes the above-cited objects by providing a motor pump unit wherein a pair of pump casings are formed at opposite ends of the motor casing. The motor casing includes an enclosure means or can which hermetically separates the central rotor chamber from an annular stator chamber. The rotor is formed to act as a journal with the enclosure means acting as a sleeve bearing. Hydraulic thrust is balanced by providing two impellers which may be formed integrally on the ends of the rotor member and positioned in the two pump casings. Means such as bumper plates are formed on the end surfaces of the pump casings to provide axial thrust protection during start-up, and the impellers may be formed with openings extending toward the bumper plates to provide hydrodynamic thrust balancing.

Desirably the flux lines through the magnetic rotor tend to position the rotor axially and the use of two opposed impellers with the suction ports being fed from a common header further provides for axial thrust balancing. If desired, the discharge outlets of the two pump casings may be tied together for further pressure balancing of the unit.

It will be appreciated that the combining of the bearing (both thrust and radial) functions of the motor together with the combining of the impeller function with the rotor member serve to not only decrease the size of the motor pump unit but also to decrease the weight thereof. By proper choice of materials for the construction of the motor pump unit, a thermal barrier, normally necessary for high temperature fluids, may also be eliminated.

Figure 2:
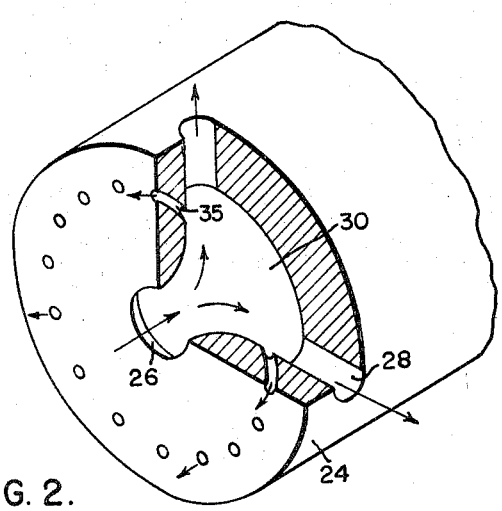

These and other objects and advantages of the present invention will become more apparent when considered in view of the following detailed description and drawing, in which:

FIGURE 1 is a longitudinal sectional view of a motor pump unit constructed in accordance with the principles of this invention; and FIG. 2 is a fragmentary view, partially cut away of one end of the combined rotor-impeller of the motor pump unit.

Referring to the drawings, it will be seen that a motor pump unit 10 constructed in accordance with the principles of this invention includes an outer pressure housing 12 of tubular configuration having a pair of pump casings 14 disposed within housing 12 and positioned adjacent the ends thereof. Each of the pump casings 14 includes a suction port 16 formed in one of the end surfaces thereof and a discharge outlet 18 positioned adjacent one side thereof. Each pump casing 14 includes a relatively large opening 20 therein positioned oppositely of the suction ports 16 and through which the adjacent end of a combined rotor-impeller member 22 extends. The rotor-impeller member extends within the pump casing 14 to a position closely adjacent the end wall thereof such that the impeller section 24 is positioned entirely within pump casing 14. Each of the impeller sections may be formed integrally on the member 22 by suitable machining thereof. More particularly, each impeller section 24 includes an eye 26 positioned opposite the suction port 16 and a plurality of discharge openings 28 which communicate with the eye 26. In this example of the invention the discharge openings 28 comprise a plurality of equidistantly spaced radially extending openings which communicate with a central impeller opening 30 of generally stream-lined configuration such that the side walls of each of the discharge openings 28 serve as the blades for the impeller. If desired, vanes (not shown) may be positioned near the pump casing 14 intermediate the discharge openings 28 of impeller portion 24 and the discharge nozzle 18.

In order to accommodate axial thrust along the impeller-rotor 22, a pair of annular bumper pads 32 are positioned adjacent the opposed ends of the pump casings 14 surrounding the suction ports 16. The pads 32 may be formed from a suitable material such as tungsten carbide and serve particularly to provide thrust protection during start-up or from internal forces on the rotor. For certain applications, additional hydodynamic thrust balancing may be provided by forming a plurality of circumferentially spaced flow passageways 35 in each of the rotor sections 24 juxtaposed to each of the pads 32. More particularly, the flow passageways 35 communicate between the central impeller opening 32 and the end faces of the rotor-impeller member 22.

A rotor enclosure or can 34 extends between each of the openings 20 in the spaced pump casings 14 and separates the central region of the motor pump unit 10 into a rotor cavity 36 surrounded by an annular stator chamber 38. In the stator chamber 38 there is provided a stator structure or core 40 formed in a manner well known in the art and comprising for example a plurality of stacked stator punchings 42 having axially extending windings (not shown) extending through aligned openings in the punchings 42 and terminating in end turns 44. The stator core 40 fills the space between outer casing 12 and can 34 and serves as a pressure back-up means for can 34. The remainder of the stator chamber desirably is filled with a suitable heat conducting insulative medium, for example, a potting compound of one of many compositions well known in the art and designated by the reference character 46.

Terminal means 56 are formed to penetrate the outer housing 12 for the purpose of energizing the stator windings in a manner (not shown) well known in the art.

The can 34 desirably is secured to each of the pump casings 14 by annular seal rings 48 located at the junction between the can 34 and each of the pump casings 14. The seal rings serve as a support for securing hermetically the can to the pump casings. Depending on the materials forming the can 34 and pump casings 14, different types of sealing means are employed for securing the seal rings 48 thereto, for example, welding or brazing. The can 34, for high temperature applications, desirably is formed from a ceramic material, for example high density beryllium oxide and serves not only to hermetically isolate the stator chamber from the rotor chamber but also as a sleeve bearing means for the combined rotor-impeller member 22. The member 22 in this example is formed from a single metal structure, for example grade 410 stainless steel and serves the additional function of a bearing journal. A carbide coating desirably is provided on the bearing surface member 22 to minimize frictional interaction with the can 34. Fluid is permitted to pass from each impeller to the region between rotor 22 and enclosure 34 and serves to create a fluid film therebetween to further reduce the friction therebetween.

In this example, a solid rotor is employed. If desired, the rotor may be of the squirrel-cage type wherein slots or holes are formed in the outer section of the rotor member to receive axially extending squirrel-cage windings and circumferential squirrel-cage collector rings secured to each of the winding ends. In this event, the rotor may then be clad with a thin cylindrical enclosure to protect the same.

To provide further thrust and hydraulic balancing of the motor pump unit 10, each of the suction ports 16 may be connected to a common header or suction manifold by appropriate piping indicated by the reference character 50 and similarly each of the discharge nozzles may be connected to a common discharge manifold as indicated by suitable piping as indicated by the reference character 32. The piping means 50 and 52 are secured to the suction ports 16 and discharge nozzles 18, respectively, by suitable hermetic means such as by circumferential welds and similarly the outer casing 12 is secured to each of the pump casings 14 by annular welds 54 adjacent the ends of outer housing 12.

It will be appreciated that the motor pump unit of the instant invention does not include a thermal barrier interposed between the impeller and the motor suction thereof. Thus, to accommodate the temperature generated by the motor and by the fluid being pumped, it is necessary to form the motor pump unit 10 from suitable materials which are capable of withstanding the temperatures encountered. For certain applications wherein a high temperature liquid metal, such as liquid potassium at 1000° F., is being pumped, the following materials may be employed to accommodate the temperatures encountered and the corrosive effects of the liquid medium. The basic structural material for the motor pump unit 10 would comprise a niobium-zirconium alloy, for example Nb–½% Zr by weight. Thus, the pump casings 14, suction ports 16, discharge nozzles 18 and conduit means 50 and 52 will be formed from the latter alloy. The outer shell 12, however, may be formed from pure niobium, if desired. As previously poitned out, the rotor 22 may be formed from 410 stainless steel and having a carbide coating which may be applied by suitable means such as by spraying and the can 34 may be formed from beryllium oxide. The seal rings 48 desirably are formed from nickel with the sealing of the ceramic can 34 to the metallic pump casing 14 being achieved in this instance by metallizing a portion of the ceramic can adjacent ring 48 with, for example, a molybdenum-manganese composition which is sintered on can 34. Ring 48 is then secured to the metallized can portion by suitable means as by brazing and ring 48 is secured to the metallic pump casing for example by welding.

In the event a lower temperature application for the motor pump unit 10 is visualized, more common materials such as carbon and stainless steel could be substituted for the materials set forth above.

It will be appreciated that the motor pump 10 of this invention is not only compact in size but is of minimized weight. For example, a pump having a capacity of 50 gallons per minute with a head of 40 feet and a motor rotating at 12,000 r.p.m. for use in a system operating at 1000° F. and 150 p.s.i. can be constructed to weigh between 50 and 90 pounds. As pointed out above by using more common materials, the weight of such a motor pump unit may be reduced even further.

From the foregoing description, it will be appreciated that many modifications may be made without departing from the broad spirit and scope of this invention. Accordingly, it is specifically intended that the specific embodiments described in detail herein be interpreted as illustrative of this invention and not as limitative thereof.

What is claimed is:

1. A motor pump unit comprising a tubular enclosure having an annular stator positioned therein and forming a central rotor bore, a pair of pump casings disposed in said enclosure and mounted respectively adjacent the ends of said stator, enclosure means lining said rotor bore and hermetically secured at its ends to said enclosure to isolate said stator from said rotor bore, a rotor having a cylindrical surface closely received in said rotor bore and cooperating with said enclosure means to form the sole rotational bearing for said unit, and said rotor having impeller means thereon adjacent each of the ends thereof, said impeller means respectively extending into said pump casings.

2. The motor pump unit of claim 1 wherein said impellers are formed integrally on said rotor member.

3. A motor pump unit of claim 2 wherein said rotor comprises a unitary member and having lubricating means formed on the surface thereof juxtaposed to said enclosure means.

4. In a motor pump unit, a pair of opposed pump casings mounted in spaced opposed relationship, dynamoelectric means positioned between said casings, said pump casings and said dynamoelectric means forming a passageway therethrough which extends between opposed end walls of said pump casings, a rotor having a pair of impellers mounted on the opposed ends thereof positioned in said passageway with the impellers positioned closely adjacent but axially spaced from said opposed end walls, and bumper means mounted on said end walls to engage said impellers, respectively, upon axial displacement thereof to absorb the axial thrust created by such displacement.

5. The motor pump unit of claim 4 wherein said impellers including a plurality of symmetrically arranged flow passageways for conducting fluid from the eye of said impellers to the adjacent bumper means.

6. The motor pump unit of claim 4 wherein said impellers are formed integrally on the ends of said rotor.

7. The motor pump unit of claim 4 wherein an enclosure means lines the portion of said passageway intermediate said pump casings and said rotor and said enclosure means cooperate to form the sole radial antifrictional means for said unit.

8. The motor pump unit of claim 7 wherein said enclosure means is formed from a ceramic material and said rotor includes a ceramic coating on the surface thereof juxtaposed to said enclosure means.

References Cited

UNITED STATES PATENTS 2,814,254  11/1957  Litzenberg _____ 103—87
3,022,739  2/1962   Herrick et al. _____ 103—87

ROBERT M. WALKER, *Primary Examiner.*